July 14, 1964

R. R. ATHERTON 3,141,124

SHUNT REGULATING CHARGING CIRCUIT

Filed March 20, 1961

INVENTOR.
ROBERT R. ATHERTON

BY

*H. H. Luecke*
ATTORNEYS

3,141,124
SHUNT REGULATING CHARGING CIRCUIT
Robert R. Atherton, Indianapolis, Ind., assignor to the United States of America as represented by the Secretary of the Navy
Filed Mar. 20, 1961, Ser. No. 97,115
5 Claims. (Cl. 320—1)
(Granted under Title 35, U.S. Code (1952), sec. 266)

The invention described herein may be manufactured and used by or for the Government of the United States of America for governmental purposes without the payment of any royalties thereon or therefor.

The present invention relates generally to charging circuitry and more particularly to full-wave charging circuitry utilizing controlled rectifiers in a novel arrangement for supplying regulated electrical energy to a storage means to charge it to a prescribed voltage, which may be in excess of the maximum rating of available controlled rectifiers, within a given limited time interval.

Those concerned with the development of charging circuitry for use in both military and general electronics applications have recognized for some time the need for such circuitry which would be quite small in size and bulk, have low energy dissipation except during the period when the storage means is actually receiving charging energy, and provide good transient response with proper damping. The present invention fulfills this need. The vacuum tube units presently available have large dissipation losses and are usually excessively large in size and bulk. Present transistor charging units, due to the voltage and power limitations of transistors, require some type of alternating current line voltage regulation, such as a magnetic amplifier, to prevent damage to the transistors. Presently, both vacuum tube and transistor devices leave much to be desired with regard to transient response and associated damping.

The present invention overcomes these disadvantages of the prior art by utilizing controlled rectifiers in a novel full-wave charging circuit which may be relatively small in size to provide a direct current charge to a storage means for accurately charging it to a prescribed voltage level with dissipation present only during the period that energy is actually being delivered to the storage means. To attain this, the present invention embodies a unique control circuit power supplying arrangement wherein a source of charging energy in the form of an alternating current voltage is supplied through the primary winding of a transforming means to secondary windings which are coupled, in conjunction with associated diode rectifiers, in a full-wave rectifying circuit to supply a direct current charging voltage to the storage means to be charged which, for example, may be considered to be a load capacitor. This direct current charging voltage across the load capacitor is constantly sampled and compared with a reference voltage set to the desired value to which the capacitor is to be charged, in a voltage comparator pulse generator circuit. When the charging voltage across the load capacitor becomes equal to the reference voltage, indicating that the capacitor has become charged to the desired level, the voltage comparator circuit provides a gating pulse simultaneously to the gate electrodes of each of two controlled rectifier units. These units are three-element devices of the type described in an article "A Silicon-Controlled Rectifier," by D. K. Bisson and R. F. Dyer in the American Institute of Electrical Engineers Transactions, volume 78, Part I, Communication and Electronics, 1959, pages 102–106.

Each of these controlled rectifier units is coupled in series with a resistance and a portion of one of the secondary windings of the transforming means to form a closed loop around which a portion of the current established by the voltage induced in each winding may flow during the respective half cycle in which the controlled rectifier is forward biased and receives the necessary gating pulse from the voltage comparator circuit indicating that the voltage across the capacitor has reached the desired level. Since the two secondary windings of the transforming means are coupled in a fullwave rectifying arrangement, the respective voltages in these windings will be 180° out of phase with respect to each other and consequently, the respective controlled rectifiers will be alternately forward biased. Thus a gating pulse simultaneously applied to both controlled rectifiers will be effective in placing in a state of conduction only the one which is at that time forward biased by the induced charging potential. Continuous gating pulses will be supplied so long as the voltage across the load capacitor and its associated diode remains equal to the reference voltage of the comparator circuit; therefore, the controlled rectifiers will alternately conduct as each becomes forward biased. When one of the controlled rectifiers conducts, it effectively becomes a short circuit and permits a portion of the current formerly supplied to the load capacitor to circulate around the loop formed by the rectifier, resistance, and the portion of associated secondary winding, thereby decreasing the voltage applied to the load capacitor to a value below that to which it has been charged; a diode means prevents the load capacitor from discharging back through the voltage comparator circuitry and it is thus maintained at the desired voltage until discharged through a load. At that time its decreasing voltage would be sensed by the voltage comparator which, upon finding it in a discharged condition, would immediately stop supplying gating pulses to the controlled rectifiers, thus causing them to return to a blocking state thereby placing the entire charging potential of the secondary windings across the load capacitor once again to re-charge it to the desired voltage.

An object of the present invention is the provision of a circuit for charging a storage means to a prescribed voltage.

Another object is to provide a device utilizing controlled rectifiers in a full-wave charging circuit which will permit charging a storage means to a voltage greater than the maximum rating of available controlled rectifiers.

A further object of the invention is to provide a capacitor charging circuit with minimum dissipation loss.

Still another object is to provide capacitor charging circuitry which is small in size and light in weight.

A still further object of the present invention is to provide a charging circuit which will fully charge a capacitor within a given limited time interval.

Yet another object is to provide a full-wave charging circuit which will charge a capacitor to a predetermined voltage level and maintain it at that level until its stored energy is to be utilized.

Other objects and advantages of the invention will hereinafter become more fully apparent to those skilled in the art as the disclosure is revealed in the following detailed description of a preferred embodiment of the invention as illustrated in the accompanying sheet of drawing in which.

Figure 1:
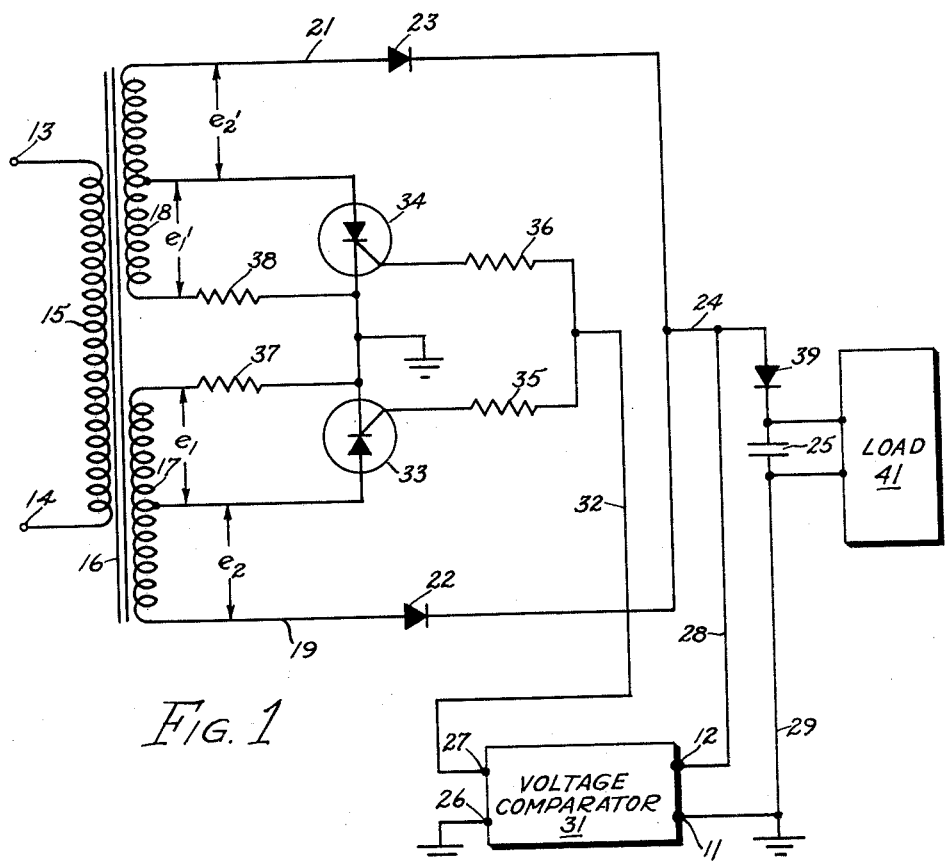
FIG. 1 shows a schematic diagram of a preferred form of the invention.

Referring now to FIG. 1, there is shown a specific embodiment of the invention in which element 16 is a transforming means having a primary winding 15 with input terminals 13 and 14, and secondary windings 17 and 18 having one end of each winding coupled to ground through resistances 37 and 38, respectively. The other ends of each of the secondary windings are coupled via conductors 19 and 21 through diode rectifiers 22 and 23, respectively, to conductor 24 forming a full-wave rectifying arrangement to supply charging energy through diode 39 to storage means 25. Element 41 may be any suitable load for utilizing the energy to be accumulated in storage means 25. Voltage comparator pulse generator 31, which may be of the type disclosed by this inventor in his United States Patent Number 3,033,996 for a "Voltage Comparator Having Pulse Generator Operative When Input Voltage Back-Biases Comparison Diode," filed November 15, 1960, has input terminals 11 and 12 coupled across storage means 25 through isolating diode 39 via conductors 28 and 29, and output terminals 26 and 27. Terminal 27 is coupled via conductor 32 and resistances 35 and 36 to the gate electrodes of controlled rectifiers 33 and 34, respectively.

With reference to FIG. 2(a), the half-cycle series of dashed-line waveforms having the greater amplitude represents the relative magnitude $(e_1+e_2)$ of the available full-wave rectified charging potential; the half-cycle series of dashed-line waveforms of lesser amplitude represents the relative magnitude $(e_2)$ of the standby (or non-charging) potential; the solid line waveform, which follows first the envelope of the "$e_1+e_2$" waveform until time $t_3$, and then decreases to follow the envelope of the "$e_2'$" waveform until time $t_4$ et cetera, represents the relative magnitude of the full-wave rectified potential actually applied to storage means 25; and the horizontal dashed line represents the desired charging level for storage means 25. In FIG. 2(b) the solid line curve represents the increasing level of charge accrued by storage means 25 as it rises from zero at time $t_0$, to the desired level (represented by the horizontal dashed line) at time $t_3$, and its maintenance at this level through time $t_7$.

Operation

Assume that storage means 25 is initially completely discharged and that an analysis of load 41 has resulted in a determination of the amount of energy required to be supplied by the storage means, and thus the voltage level to which it must be charged if it is to supply this energy. Having determined this requirement, the invention may be utilized to charge storage means 25 to the desired voltage level as follows. The reference voltage level of voltage comparator 31 is set to the value of voltage to which storage means 25 is to be charged, so that comparator 31 may supply control pulses to the charging circuitry when this desired level of charge has been reached.

When input terminals 13 and 14 are coupled across a source of alternating current potential, the resulting alternating current which flows in primary winding 15 induces voltages in secondary windings 17 and 18 which, because of the full-wave rectifying arrangement of these windings, are 180° out of phase with respect to each other. The voltage induced in winding 17 (shown as $e_1+e_2$ in FIG. 1) establishes an alternating current flow through conductor 19 to diode rectifier 22 which permits positive half cycles of the current waveform to pass through to conductor 24; in a like manner, the voltage induced in winding 18 (shown $e_1'+e_2'$) establishes an alternating current flow through conductor 21 to diode rectifier 23 which permits positive half cycles of this current waveform to pass through to conductor 24, and since the voltages induced in windings 17 and 18 are 180° out of phase with respect to each other, their respective current waveforms will also possess this relative phase differential with respect to each other. Therefore, conductor 24 will receive positive half cycles of charging current alternately from diodes 22 and 23, forming a positive pulsating direct current, shown in FIG. 2(a) as being composed of alternate envelopes $e_1+e_2$ and $e_1'+e_2'$, which is supplied through diode 39 to charge storage means 25 to the predetermined desired voltage level.

The magnitude of the charging potential applied via diode 39 across storage means 25 from the time that charging is begun until it reaches the desired level is determined by the source of alternating current charging potential and the turns ratio of transformer 16 which is constructed so that the following conditions will exist: $|e_1|=|e_1'|$, $|e_2|=|e_2'|$, $e_1+e_2$ is greater than the voltage to which storage means 25 is to be charged, and $e_2$ is less than the voltage to which storage means 25 is to be charged.

From the time that this charging potential having a magnitude $e_1+e_2$ is applied across initially discharged storage means 25, until the storage means reaches the desired level of charge, the instantaneous voltage drop across diode 39 and storage means 25, indicating its increasing level of charge, is constantly available through conductors 28 and 29 at input terminals 11 and 12 of voltage comparator 31. Voltage comparator 31 compares this increasing voltage level at terminals 11 and 12 with its preset voltage reference level to which storage means 25 is to be charged. When these two voltages become equal indicating that storage means 25 has reached its desired level of charge, voltage comparator 31 begins generating continuous gating control pulses across output terminals 26 and 27 which are supplied via conductor 32 and resistances 35 and 36 to the gate electrodes of normally nonconducting controlled rectifiers 33 and 34. These gating pulses place each of rectifiers 33 and 34 in a state of conduction for the respective positive half cycle during which each is forward biased. While in a state of conduction, these rectifiers appear as short circuits to current flowing in the forward direction; thus during this period of conduction voltage $e_1$ will establish a current flow around the loop formed by rectifier 33, resistance 37, and the included portion of secondary winding 17, and $e_1$ will appear as a voltage drop across resistance 37 so that the charging potential applied across storage means 25 suddenly drops from $e_1+e_2$ to $e_2$, a level below that to which the storage means is presently charged. Similar action occurs in the loop formed by rectifier 34, resistance 38, and the included portion of secondary winding 18. Thus it can be seen that the charging of storage means 25 ceases upon reaching the desired charging level. The arrangement of diode 39 prevents charged storage means 25 from exhibiting a smoothing action to the direct current charging potential during the charging cycle, and from discharging back through voltage comparator 31 after the charging potential is reduced to standby voltage $e_2$. Storage means 25 then remains charged until its energy is utilized by load 41.

Figure 2:
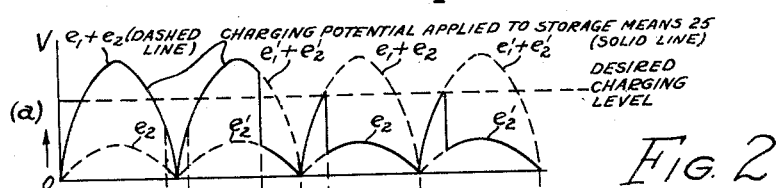
FIG. 2 depicts the various waveforms associated with the charging action of the preferred embodiment.
Figure 2:
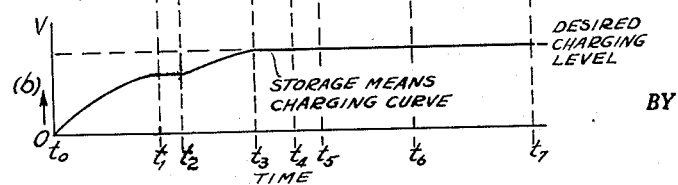

With reference to the waveforms of FIG. 2, assume time $t_0$ to occur at a time when the rectified charging potential $e_1+e_2$ is zero and storage means 25 is completely discharged. Upon initiation of the charging cycle at time $t_0$ storage means 25 will be charged by potential $e_1+e_2$ until time $t_1$ whereupon the instantaneous value of the charging potential of the first half cycle, in returning to zero, drops below the charge accrued by storage means 25. From time $t_1$ to $t_2$ storage means 25 will maintain its accrued charge, as shown by the horizontal portion of the charging curve between times $t_1$ and $t_2$ in FIG. 2(b), assuming no energy to be consumed by load 41, since the arrangement of diode 39 prevents its discharge through comparator 31. At time $t_2$ potential $e_1'+e_2'$ exceeds the accrued charge of storage means 25 and charging current again flows. At time $t_3$ the storage means reaches its desired level of charge and comparator 31, sensing this condition, sends gating pulses to nonconducting controlled rectifiers 33 and 34 causing rectifier 34 (which is the one positively biased during the half cycle in which time $t_3$ is illustrated to occur) to begin conduction. The charging potential immediately drops from $e_1'+e_2'$ to $e_2'$ and remains at this level from time $t_3$ to $t_4$, during which time storage means 25 remains at its accrued desired level of charge. At time $t_4$ nonconducting controlled rectifier 33 becomes positively biased for its respective half cycle; however, at this time diode 39 is reverse biased preventing comparator 31 from sensing the level of charge of storage means 25, therefore no gating pulses are are provided to the controlled rectifiers which remain in a state of nonconduction until time $t_5$ when diode 39 again becomes forward biased. Thus during time $t_4$ to $t_5$ the charging potential follows the $e_1+e_2$ waveform. At time $t_5$ comparator 31 senses that storage means 25 is charged to the desired level and again supplies gating pulses to the control rectifiers placing positively biased rectifier 33 in a state of conduction and reducing the charging potential to the standby value of $e_2$ at which it remains from time $t_5$ to $t_6$. The action from time $t_6$ to $t_7$ is equivalent to that from time $t_4$ to $t_6$ except that controlled rectifier 34 is the one positively biased during time $t_6$ to $t_7$. This action continues and storage means 25 is thus maintained at the desired level of charge until its energy is utilized by load 41. If load 41 does not utilize the energy within a reasonable time and the storage means should be, for example, a capacitor, internal leakage may occur causing the level of charge to drop below that desired. In either case, i.e., (1) utilization of the charge by load 41, or (2) internal leakage by the storage means, as soon as the level of charge falls below that desired, comparator 31 senses the change and immediately ceases all gating pulses to controlled rectifiers 33 and 34, causing each to cease conduction upon becoming reverse biased at the conclusion of the next respective half cycle. The charging potential thereby increases from the standby value of $e_2$ to $e_1+e_2$ and the charging cycle repeats to return storage means 25 to the desired level of charge. The number of half cycles of charging potential required to raise storage means 25 to the desired level of charge may be decreased, at the expense of increased power dissipation, by decreasing the ohmic value of resistors 37 and 38.

Thus it becomes apparent from the foregoing description and annexed drawing that the disclosed invention, an accurate regulated charging circuit, is a useful and practical device having many applications, both industrial and military, in the field of electronics. The usefulness of this invention is enhanced by its ability to charge and maintain a storage means at a desired level with a minimum of dissipated energy resulting from the novel utilization of control circuitry employing controlled rectifiers enabling the construction of a circuit having minimum size, weight, and bulk.

Obviously many modifications and variations of the present invention are possible in the light of the above teachings. For example, at the expense of approximately a two-to-one increase in charging time for a given set of circuit parameters, the circuit can be reduced to a half-wave device by elimination of secondary winding 18 and its associated circuitry. It is therefore to be understood that within the scope of the appended claims the invention may be practiced otherwise than as specifically described.

What is claimed is:

1. A circuit for charging and maintaining a storage means at an adjustable exact predetermined level of charge comprising: a transforming means having a primary winding and first and second secondary windings, said primary winding being coupled across a source of alternating current potential and said first and second secondary windings being coupled in push-pull arrangement through diode rectifying means for transforming said alternating current potential into a direct current charging potential; a storage means, associated through a coupling means with said transforming means, for storing energy received from said direct current charging potential; first and second control switching elements, said first control switching element being coupled across a portion of said first secondary winding and said second control switching element being coupled across a portion of said second secondary winding; a voltage comparison control means coupled to said storage means and said first and second control switching elements to constantly monitor the amount of charge possessed by said storage means and to send control impulses to said first and second control switching elements to regulate the level of said direct current charging potential supplied to said storage means to maintain its quantity of charge at a predetermined value.

2. A circuit for charging and maintaining a storage means at an adjustable predetermined level of charge as set forth in claim 1 wherein said coupling means is a diode means coupled between said transforming means and said storage means and in series with said storage means to prevent said storage means from exhibiting a smoothing action to said direct current charging potential during a charging cycle, and to prevent said storage means from discharging through said voltage comparison control means during a standby cycle.

3. A circuit according to claim 2 wherein said first and second control switching elements are controlled rectifiers, each having anode, cathode, and gating electrodes, each said cathode electrode being coupled in common to ground and further coupled through its respective resistance to an end terminal of its associated secondary winding, each said anode electrode being coupled to an intermediate turn of its associated secondary winding such that each controlled rectifier forms in association with its respective resistance and portion of secondary winding a current circulating loop, each said gating electrode being coupled through its respective resistance to said voltage comparison control means for receiving said control impulses to permit said controlled rectifiers to be placed in a state of conduction allowing a portion of the current in said first and second secondary windings to circulate around each respective said current circulating loop.

4. A circuit for charging and maintaining a storage means at an adjustable exact predetermined level of charge comprising: a transforming means having a primary winding and first and second secondary windings, said primary winding being coupled across a source of alternating current potential and said first and second secondary windings being coupled in push-pull arrangement through diode rectifying means for transforming said alternating current potential into a direct current charging potential; a storage means coupled to said transforming means for storing energy received from said direct current charging potential; first and second controlled rectifiers, said first controlled rectifier being coupled across a portion of said first secondary winding, and said second controlled rectifier being coupled across a portion of said second secondary winding; a voltage comparison control means coupled to said storage means and said first and second controlled rectifiers to constantly monitor the amount of charge possessed by said storage means and to send control impulses to a gating electrode of each of said first and second controlled rectifiers to permit said controlled rectifiers to be placed in a state of conduction allowing a portion of the current in said first and second secondary windings to flow around respective current circulating loops formed by said first controlled rectifier and said first secondary winding with an associated resistance, and by said second controlled rectifier and said second secondary winding with an associated resistance, to regulate the level of said direct current charging potential supplied to said storage means to maintain its quantity of charge at a predetermined value; a diode means coupled between said transforming means and said storage means and in series with said storage means to prevent said storage means from exhibiting a smoothing action to said direct current charging potential during a charging cycle, and to prevent said storage means from discharging through said voltage comparison control means during a standby cycle.

5. A charging circuit for maintaining a load capacitor at an adjustable predetermined level of charge comprising: a transforming means having a primary winding and first and second secondary windings, said primary winding being coupled across a source of alternating current potential, and said first and second secondary windings being coupled in push-pull arrangement through diode rectifying means for transforming said alternating current potential into a direct current charging potential; a load capacitor coupled to said transforming means for storing energy received from said direct current charging potential; first and second controlled rectifiers, said first controlled rectifier being coupled, in series with a first resistance, across a portion of said first secondary winding, and said second controlled rectifier being coupled, in series with a second resistance, across a portion of said second secondary winding; a voltage comparison control means coupled to said load capacitor and said first and second controlled rectifiers to constantly monitor the amount of charge possessed by said storage means and to send control impulses to a gating electrode of each of said first and second controlled rectifiers to permit said controlled rectifiers to be placed in a state of conduction allowing a portion of the current in said first and second secondary windings to flow around respective current circulating loops formed by said first controlled rectifier, said first resistance, and said first secondary winding, and by said second controlled rectifier, said second resistance, and said second secondary winding, to regulate the level of said direct current charging potential supplied to said load capacitor to maintain its quantity of charge at a predetermined value; a diode means coupled between said transforming means and said load capacitor and in series with said load capacitor to prevent said load capacitor from exhibiting a smoothing action to said direct current charging potential during a charging period, and to prevent said load capacitor from discharging through said voltage comparison means during a standby period, said diode means having its direction of least resistance from said charging circuitry toward said load capacitor.

References Cited in the file of this patent

UNITED STATES PATENTS

| | | |
|---|---|---|
| 2,503,880 | Mah | Apr. 11, 1950 |
| 2,838,726 | Boyer | June 10, 1958 |
| 2,935,650 | Rock | May 3, 1960 |
| 3,012,181 | Schultz | Dec. 5, 1961 |

OTHER REFERENCES

Harvey: Battery Chargers and Charging, London (1953), pp. 68–69 relied on.